(12) United States Patent
Yanagibashi et al.

(10) Patent No.: US 11,958,017 B2
(45) Date of Patent: Apr. 16, 2024

(54) HOLLOW FIBRE MEMBRANE MODULE AND METHOD FOR MANUFACTURING HOLLOW FIBRE MEMBRANE MODULE

(71) Applicant: Toray Industries, Inc., Tokyo (JP)

(72) Inventors: Masato Yanagibashi, Otsu (JP); Atsushi Kobayashi, Otsu (JP); Shun Shimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 562 days.

(21) Appl. No.: 17/263,380

(22) PCT Filed: Jul. 26, 2019

(86) PCT No.: PCT/JP2019/029522
§ 371 (c)(1),
(2) Date: Jan. 26, 2021

(87) PCT Pub. No.: WO2020/022506
PCT Pub. Date: Jan. 30, 2020

(65) Prior Publication Data
US 2021/0316253 A1    Oct. 14, 2021

(30) Foreign Application Priority Data
Jul. 27, 2018  (JP) ................................ 2018-141044

(51) Int. Cl.
*B01D 63/02*    (2006.01)
*B01D 63/04*    (2006.01)
(Continued)

(52) U.S. Cl.
CPC ....... *B01D 63/022* (2013.01); *B01D 63/0231* (2022.08); *B01D 63/04* (2013.01);
(Continued)

(58) Field of Classification Search
USPC .............. 210/500.1, 500.21, 500.23, 321.89
See application file for complete search history.

(56) References Cited

U.S. PATENT DOCUMENTS

| 5,472,601 A | 12/1995 | Eguchi et al. |
| 9,227,160 B2 | 1/2016 | Cao |

(Continued)

FOREIGN PATENT DOCUMENTS

| CN | 105142764 A | 12/2015 |
| DE | 102015015149 B3 | 1/2017 |

(Continued)

OTHER PUBLICATIONS

Machine translation of WO-2013146080-A1, pp. 1-31. (Year: 2013).*

(Continued)

*Primary Examiner* — Clare M Perrin
(74) *Attorney, Agent, or Firm* — Buchanan Ingersoll & Rooney

(57) ABSTRACT

The present invention relates to a hollow-fiber membrane module including: a hollow-fiber membrane bundle including a plurality of hollow-fiber membranes bundled in a potting part; a housing enclosing the hollow-fiber membrane bundle; and a protective member contacting with an outer surface of the potting part and continuously covering the outer surface, in which the protective member has a notched part through which one end of the protective member communicates with another end in a longitudinal direction of the hollow-fiber membrane bundle.

7 Claims, 9 Drawing Sheets

(51) Int. Cl.
    *B01D 69/10*     (2006.01)
    *B01D 69/08*     (2006.01)

(52) U.S. Cl.
    CPC ......... *B01D 69/10* (2013.01); *B01D 63/0225* (2022.08); *B01D 69/08* (2013.01); *B01D 2313/23* (2013.01)

(56) References Cited

U.S. PATENT DOCUMENTS

| | | | |
|---|---|---|---|
| 2003/0107150 A1 | 6/2003 | Hamanaka et al. | |
| 2004/0045893 A1 | 3/2004 | Watanabe et al. | |
| 2009/0218274 A1 | 9/2009 | Sakashita et al. | |
| 2016/0107125 A1* | 4/2016 | Kobayashi | B01D 63/04 210/232 |
| 2016/0193570 A1 | 7/2016 | Kobayashi et al. | |
| 2016/0317972 A1 | 11/2016 | Matsumoto et al. | |
| 2019/0262774 A1 | 8/2019 | Matsumoto et al. | |

FOREIGN PATENT DOCUMENTS

| | | |
|---|---|---|
| EP | 1964603 A1 | 9/2008 |
| JP | 51106245 U | 8/1976 |
| JP | 06296834 A | 10/1994 |
| JP | 2007-144349 A | 6/2007 |
| JP | 4498373 B2 | 7/2010 |
| JP | 2012210653 A | 11/2012 |
| KR | 20160061988 A | 6/2016 |
| WO | 2011105495 A1 | 9/2011 |
| WO | 2013146080 A1 | 10/2013 |
| WO | WO-2013146080 A1 * | 10/2013 ............ B01D 63/02 |
| WO | 2014175409 A1 | 10/2014 |
| WO | 2015098266 A1 | 7/2015 |

OTHER PUBLICATIONS

Chinese Office Action for Chinese Application No. 201980050105.9, dated Apr. 13, 2022, with translation, 23 pages.
International Preliminary Report on Patentability for International Application No. PCT/JP2019/029522, dated Jul. 26, 2019, 4 pages.
International Search Report and Written Opinion for International Application PCT/JP2019/029522, dated Oct. 8, 2019, 6 pages.
Japanese Written Explanation of Circumstances Concerning Accelerated Examination 2019-541389, dated Jul. 29, 2020, 6 pages.
Extended European Search Report for European Application No. 19840994.8, dated Mar. 30, 2022, 9 pages.
Office Action (Notice of Preliminary Rejection) issued Dec. 8, 2023, by the Korean Intellectual Property Office in corresponding Korean Patent Application No. 10-2021-7002207, and an English translation of the Office Action. (11 pages).

* cited by examiner

18

HOLLOW FIBRE MEMBRANE MODULE AND METHOD FOR MANUFACTURING HOLLOW FIBRE MEMBRANE MODULE

CROSS REFERENCE TO RELATED APPLICATIONS

This is the U.S. National Phase application of PCT/JP2019/029522, filed Jul. 26, 2019, which claims priority to Japanese Patent Application No. 2018-141044, filed Jul. 27, 2018, the disclosures of these applications being incorporated herein by reference in their entireties for all purposes.

FIELD OF THE INVENTION

The present invention relates to a hollow-fiber membrane module and a production method of a hollow-fiber membrane module.

BACKGROUND OF THE INVENTION

In recent years, a separation membrane such as a microfiltration membrane or an ultrafiltration membrane is utilized for a fluid separation process in various fields including food industry, medical treatment, biotechnology, water production, wastewater treatment, etc., because it contributes, for example, to energy saving, space saving, or product quality enhancement.

Examples of the shape of the separation membrane include a flat membrane and a hollow-fiber membrane. As for the hollow-fiber membrane, a hollow-fiber membrane module, in which a housing encloses a hollow-fiber membrane cartridge in which a multitude of hollow-fiber membrane bundles are bound together at both ends in a potting part and a cylindrical protective member contacts with the outer surface of the potting part, is known (Patent Literature 1).

PATENT LITERATURE

Patent Literature 1: Japanese Patent No. 4,498,373

SUMMARY OF THE INVENTION

However, in the conventional hollow-fiber membrane module in which a protective member contacts with the outer surface of a potting part, it is regarded as a problem that the protective member cannot smoothly follow the curing shrinkage of the potting resin or the expansion or shrinkage of the potting part during a heat treatment, etc. of the hollow-fiber membrane module and consequently, the protective member is separated from the potting part.

Accordingly, an object of the present invention is to provide a hollow-fiber membrane module capable of suppressing separation between a potting part and a protective member.

In order to attain the object above, the present invention provides a hollow-fiber membrane module including: a hollow-fiber membrane bundle including a plurality of hollow-fiber membranes bundled in a potting part; a housing enclosing the hollow-fiber membrane bundle; and a protective member contacting with an outer surface of the potting part and continuously covering the outer surface, in which the protective member has a notched part through which one end of the protective member communicates with another end in a longitudinal direction of the hollow-fiber membrane bundle. And the present invention provides a production method thereof.

In the present invention, a hollow-fiber membrane module capable of preventing a potting part and a protective member from separating from each other due to curing shrinkage of the potting agent or heat treatment of the hollow-fiber membrane module can be provided.

DETAILED DESCRIPTION OF EMBODIMENTS OF THE INVENTION

Figure 1:
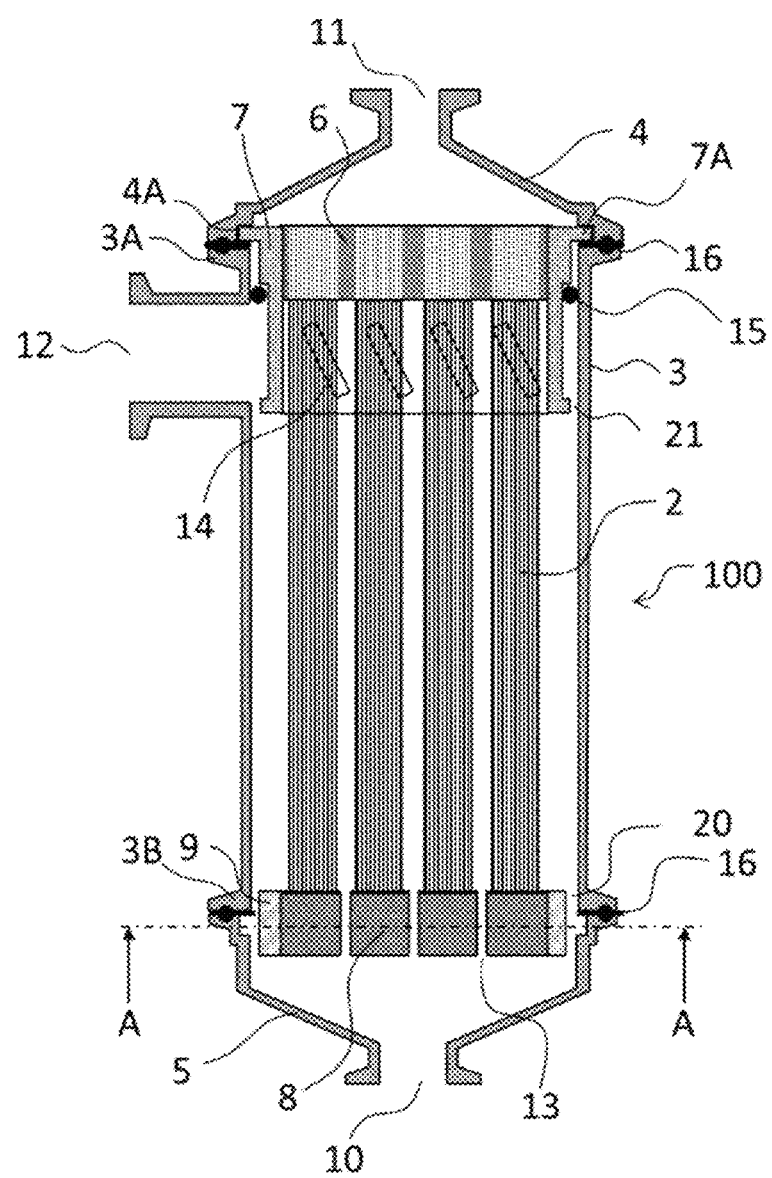
FIG. 1 is a schematic longitudinal cross-sectional diagram of the hollow-fiber membrane module of a first embodiment of the present invention.

The embodiments of the present invention are described in detail below by referring to the drawings, but the present invention is not limited by these embodiments in any way.

The hollow-fiber membrane module of the present invention must include a hollow-fiber membrane bundle including a plurality of hollow-fiber membranes bundled in a potting part, a housing enclosing the hollow-fiber membrane bundle, and a protective member contacting with the outer surface of the potting part and continuously covering the outer surface.

1. Hollow-Fiber Membrane Bundle

In the hollow-fiber membrane bundle included in the hollow-fiber membrane module of the present invention, a plurality of hollow-fiber membranes are bundled by at least one potting part.

The "hollow-fiber membrane" constituting the hollow-fiber membrane bundle indicates a hollow fiber-shaped membrane composed of a polymer and having a separation function for liquid or gas.

Examples of the polymer as a material of the hollow-fiber membrane include an olefin-based polymer such as polyethylene, ethylene-propylene copolymer, ethylene-ethyl acrylate copolymer, ethylene-vinyl acetate copolymer, ionomer, polypropylene or poly-4-methylpentene-1, a fluorine-containing polymer such as polyvinylidene fluoride, polytetrafluoroethylene, polychlorotrifluoroethylene, polyvinylidene fluoride, tetrafluoroethylene-ethylene copolymer or tetrafluoroethylene-perfluoroalkyl vinyl ether copolymer, a cellulose-based polymer such as cellulose acetate, a polyvinyl chloride, an acrylonitrile-based polymer, a silicone-based polymer, a polyamide, a polyimide, a polyethersulfone, a polysulfone, a polyphenylene oxide, a polyphenylene sulfide, a polyallylate, a polyether ether ketone, a polyether imide, a polycarbonate, a polyvinyl alcohol-based polymer, etc. In order to increase the heat resistance, physical strength and chemical durability of the obtained hollow-fiber membrane, a fluorine-containing polymer, a polyethersulfone, or a polysulfone is preferred.

From the viewpoint of satisfying both the permeation performance and the physical strength, the thickness of the hollow-fiber membrane is preferably from 20 to 500 µm, more preferably from 30 to 500 µm, still more preferably from 40 to 500 µm.

From the viewpoint of satisfying both the effective membrane area and the physical strength, the outer diameter of the hollow-fiber membrane is preferably from 100 to 2,000 µm, more preferably from 200 to 1,500 µm, still more preferably from 300 to 1,000 µm.

In view of the balance between the pressure loss of a fluid flowing through the hollow part and the buckling pressure, the percentage of hollowness of the hollow-fiber membrane is preferably from 15 to 70%, more preferably from 20 to 65%, still more preferably from 25 to 60%. The outer diameter and percentage of hollowness of the hollow-fiber membrane can be adjusted by appropriately changing, for example, the shape of a discharge hole of a spinneret for producing the hollow fiber or the draft ratio represented by winding rate/discharge rate during production of the hollow fiber.

The pore diameter or pore shape of the hollow-fiber membrane can be appropriately selected according to the separation target. The hollow-fiber membrane may be subjected, if desired, to a surface treatment such as organic solvent treatment, plasma discharge treatment, corona discharge treatment or ozone treatment. Furthermore, since a hot-water treatment or steam sterilization treatment sometimes causes thermal shrinkage of the hollow-fiber membrane, a hollow-fiber membrane subjected in advance to a preheating treatment may be used.

The "potting part" for bundling a plurality of hollow-fiber membranes indicates a region in which spaces between hollow fibers bundled is filled with a potting agent containing a potting resin as a main component, which is a so-called adhesive.

The potting resin serving as a main component of the potting agent is preferably an epoxy resin, a polyurethane resin, or a silicone resin, which are excellent in terms of adhesion to the hollow-fiber membrane, heat resistance and chemical durability. In addition, the potting agent may contain, other than the potting resin, for example, an additive such as silica, talc, mica, clay, calcium carbonate, glass or rubber. Furthermore, the potting agent may also contain, as a curing agent, an aliphatic cyclic amine-based curing agent or an aliphatic linear amine-based curing agent.

The potting part is preferably formed in an end part of the hollow-fiber membrane bundle because of ease of forming and is more preferably formed in both end parts for more firmly binding a plurality of hollow-fiber membranes together. That is, it is more preferable for the hollow-fiber membrane bundle to be bundled at its both ends in potting parts.

Examples of the method for filling a space between hollow-fiber membranes with a potting agent include a centrifugal potting method of infiltrating a potting agent by utilizing a centrifugal force, and a static potting method of infiltrating a potting agent by its natural flow. In addition, a potting resin may also be poured into a mold for cast molding and made to fill a space between hollow-fiber membranes. On this occasion, in order to prevent the potting part from deforming in an ex-post manner, the potting part may be molded by performing the filling with a potting agent and the curing shrinkage in a plurality of batches.

2. Housing

Examples of the material of a housing included in the hollow-fiber membrane module of the present invention include a fluorine-based resin such as polytetrafluoroethylene or perfluoroalkoxy fluororesin, polysulfone, polyethersulfone, polycarbonate, polypropylene, polymethylpentene, polyphenylene sulfide, polyether ketone, polyvinyl chloride resin, ABS resin, stainless steel, and aluminum.

3. Protective Member

The protective member included in the hollow-fiber membrane module of the present invention contacts with the outer surface of the potting part and continuously covers the outer surface. In addition, the protective member must have a notched part through which one end of the protective member in the longitudinal direction of the hollow-fiber membrane bundle communicates with another end.

The "protective member" as used herein indicates a member formed of a material different from the material of the potting part to be contacted and continuously covered with the protective member.

In addition, to say the protective member "contacts" with the outer surface of the potting part indicates that at least a part of the protective member is in contact with the outer surface of the potting part, directly or indirectly with the intervention of other component such as cured adhesive.

Furthermore, to say the protective member "continuously covers the outer surface" of the potting part indicates that when assuming lines L, whose start point and end point coincide with each other, drawn by setting one point within the potting part on the surface of the potting part as a basis point and connecting, in a continuous manner, the points in a direction perpendicular to the longitudinal direction of the hollow-fiber membrane bundle and when regarding the longest line among the lines L as $L_{max}$, one or plurality of protective members are arranged to cover 20% or more of the total length of the line $L_{max}$. For example, in the case where the potting part is cylindrical having a perfect circular cross-section, the line $L_{max}$ corresponds to the circumference of the perfect circle. The degree of coverage for the line $L_{max}$ is preferably 20% or more, more preferably 40% or more, still more preferably 90% or more. In addition, the degree of coverage for the line $L_{max}$ is preferably less than 99.9%.

The "notched part" of the protective member indicates a region where the outer surface of the potting part is exposed between one end part of a protective member in the longitudinal direction of the hollow-fiber membrane bundle and another end part. Note that the "another end part" may be another end part of the same protective member having the "one end part" or may be one end part of another protective member different from the protective member having the "one end part" above.

To say "one end of the protective member communicates with another end" in the longitudinal direction of the hollow-fiber membrane bundle through the notched part of the protective member indicates a state where the notched part of the protective member, i.e., the region where the outer surface of the potting part is exposed, continues without a break between one end of the protective member in the longitudinal direction of the hollow-fiber membrane bundle and another end. In the case where the protective member continuously covering the outer surface has two or more notched parts, the "protective member continuously covering the outer surface" is composed of a plurality of protective members.

The shape of the notched part, when observed from a direction perpendicular to the longitudinal direction of the hollow-fiber membrane bundle, may be linear or a shape including a curve or bent part.

When the protective member has such a notched part, the protective member can smoothly follow the shrinkage or expansion of the potting part during curing shrinkage of the potting agent or heat treatment of the hollow-fiber membrane module, and contacting between the potting part and the protective member can be maintained, so that separation therebetween can be suppressed. In order for the protective member to be capable of more smoothly following the expansion or shrinkage of the potting part, the protective member preferably has a plurality of notched parts. The width of the notched part in a direction perpendicular to the longitudinal direction of the hollow-fiber membrane bundle is preferably 0.5 mm or more, more preferably 1 mm or more, still more preferably 3 mm or more.

The ratio of the length of the protective member in the longitudinal direction of the hollow-fiber membrane bundle to the length of the potting part in the longitudinal direction of the hollow-fiber membrane bundle is preferably 10% or more so as to ensure the durability of the protective member.

Examples of the material of the protective member include a fluorine-based resin such as polytetrafluoroethylene or perfluoroalkoxy fluororesin, polysulfone, polyethersulfone, polycarbonate, polypropylene, polymethylpentene, polyphenylene sulfide, polyether ketone, polyvinyl chloride resin, and ABS resin.

Examples of the adhesive used for making the protective member contact with the outer surface of the potting part include an adhesive containing, as a main component, an epoxy resin or a polyurethane resin. In addition, the adhesive may contain, other than the adhesive, for example, an additive such as silica, talc, mica, clay, calcium carbonate, glass or rubber.

Some embodiments of the hollow-fiber membrane module of the present invention are described in greater detail below by referring to the drawings.

4. Hollow-Fiber Membrane Module

First Embodiment

Figure 2:
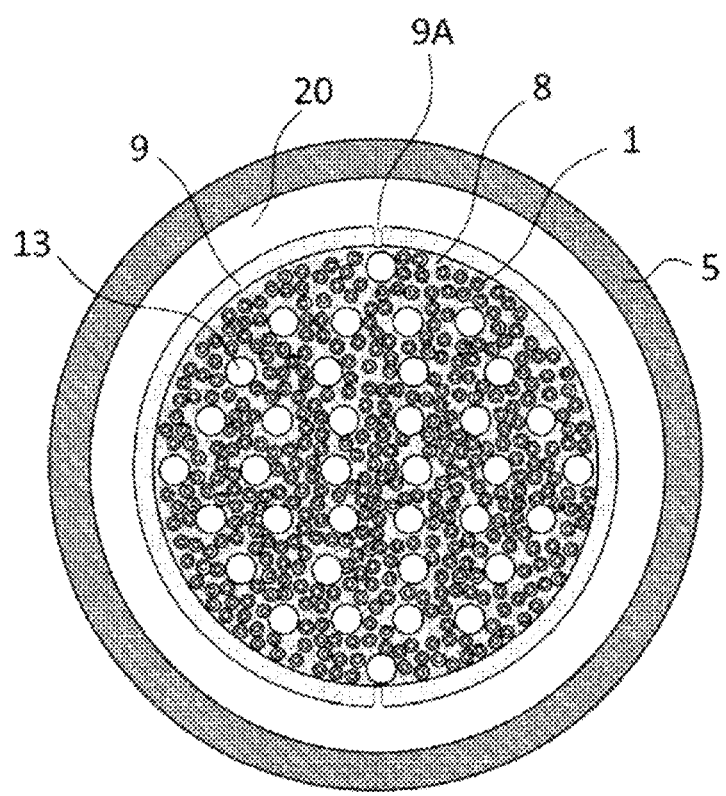
FIG. 2 is a cross-sectional diagram along line A-A in FIG. 1.
Figure 3:
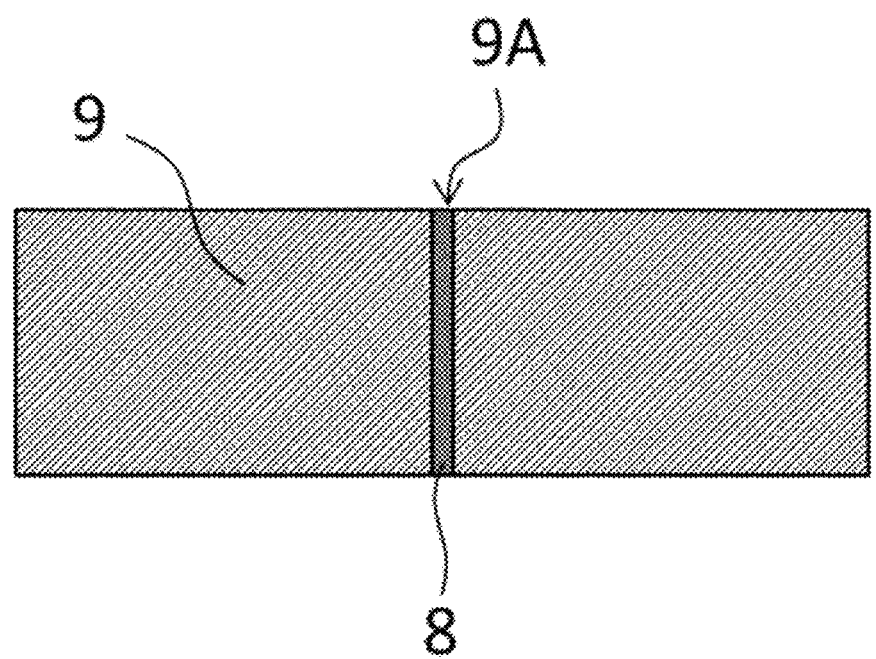
FIG. 3 is a side view of the protective member and the second potting part in FIG. 1.

FIG. 1 is a schematic longitudinal cross-sectional diagram of the hollow-fiber membrane module 100 of a first embodiment of the present invention. FIG. 2 is a cross-sectional diagram along line A-A in FIG. 1, and FIG. 3 is a side view of the protective member and the second potting part in FIG. 1.

The hollow-fiber membrane module 100 includes a hollow-fiber membrane bundle 2 in which a plurality of hollow-fiber membranes 1 are bundled into a cylindrical shape in a first potting part 6 and a second potting part 8, a housing enclosing the hollow-fiber membrane bundle 2, and a protective member 9 contacting with the outer surface of the second potting part 8 and continuously covering the outer surface. As illustrated in FIG. 2 and FIG. 3, the protective member 9 has a notched part 9A.

In all hollow-fiber membranes 1, the first end part that is an end part on the first potting part 6 side is in an open state. On the other hand, in all hollow-fiber membranes 1, the second end part that is an end part on the second potting part 8 side is in a state of being sealed by the second potting part 8.

The housing is composed of a hollow cylindrical case 3, and a first cap 4 and a second cap 5 liquid-tightly and air-tightly fixed by a gasket 16 to both end parts of the cylindrical case 3. The first cap 4 has a filtrate outlet 11, and the second cap 5 has a raw water inlet 10. In addition, the cylindrical case 3 has a raw water outlet 12 nearer the first cap 4 in its lateral part.

In both end parts of the cylindrical case 3, flange parts 3A and 3B are formed over the entire circumference. Furthermore, in the cylindrical case 3-side end part of the first cap 4, a step part 4A is formed over the entire circumference so that when the cylindrical case 3 and the fist cap 4 are fixed, a groove can be formed between the flange part 3A and the first cap 4.

The first potting part 6 is enclosed in a cylindrical flow-regulating cylinder 7. In one end part of the flow-regulating cylinder 7, a flange part 7A is formed over the entire circumference. The flange part 7A is inserted into a groove (fixing part) between the flange part 3A and the fist cap 4, and the first potting part 6 is thereby liquid-tightly and air-tightly fixed in one end part of the cylindrical case 3.

In the flow-regulating cylinder 7, a plurality of slit-like flow-regulating holes 14 extending in the longitudinal direction of the hollow-fiber membrane bundle are formed so as to prevent drift around the raw water outlet 12. In order to prevent steam drain stagnation during steam sterilization of the hollow-fiber membrane module 100, a gap 21 is provided between the cylindrical case 3 and the flow-regulating cylinder 7.

Between the flow-regulating cylinder 7 fixing the first potting part 6 and the housing, an O ring 15 is disposed as a sealing member to liquid-tightly and air-tightly partition both sides thereof.

A through-hole 13 penetrating in the longitudinal direction of the hollow-fiber membrane bundle is formed in the second potting part 8, and a gap 20 is provided between the second potting part 8 and the housing.

The protective member 9 contacts with the outer surface of the second potting part 8 and continuously covers the outer surface.

Second Embodiment

Figure 4:
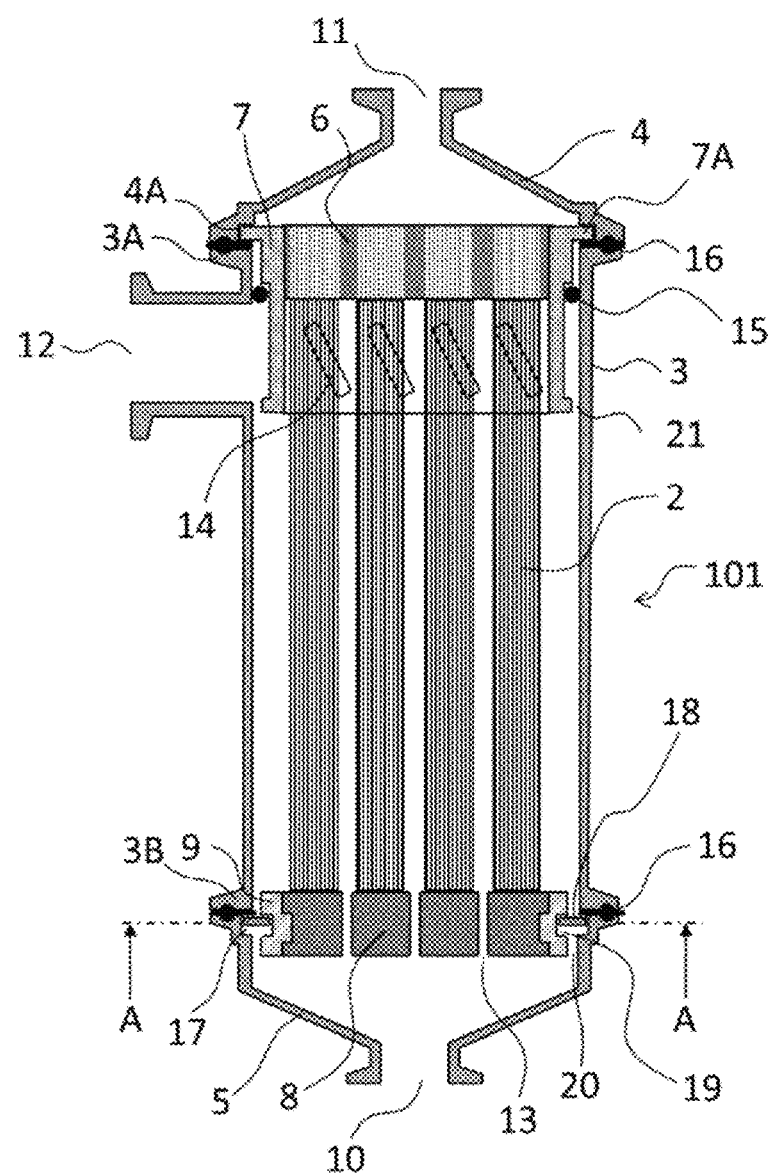
FIG. 4 is a schematic longitudinal cross-sectional diagram of the hollow-fiber membrane module of a second embodiment of the present invention.
Figure 5:
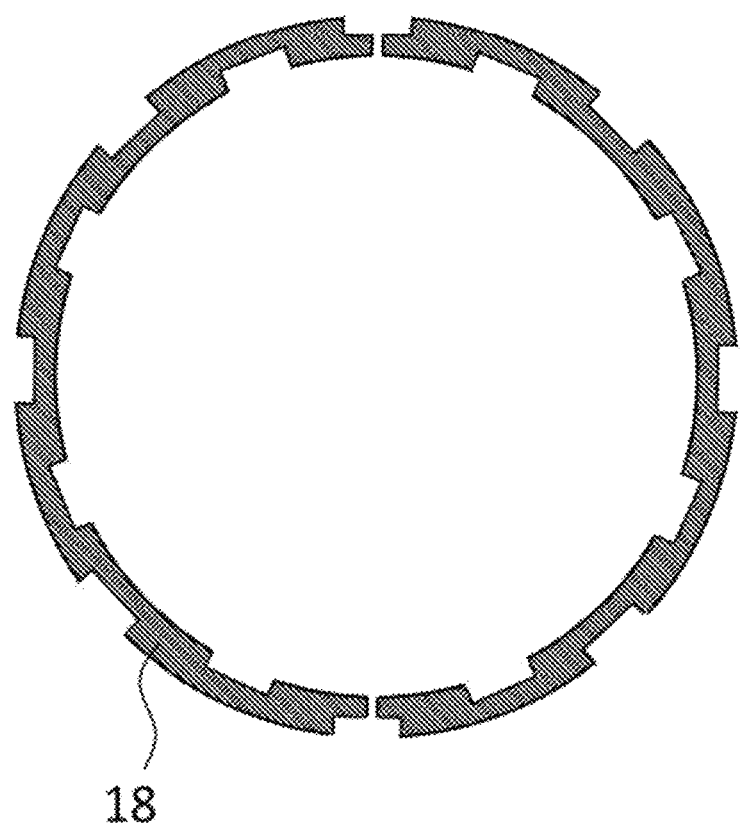
FIG. 5 is a schematic diagram of a ring having a notch.
Figure 6:
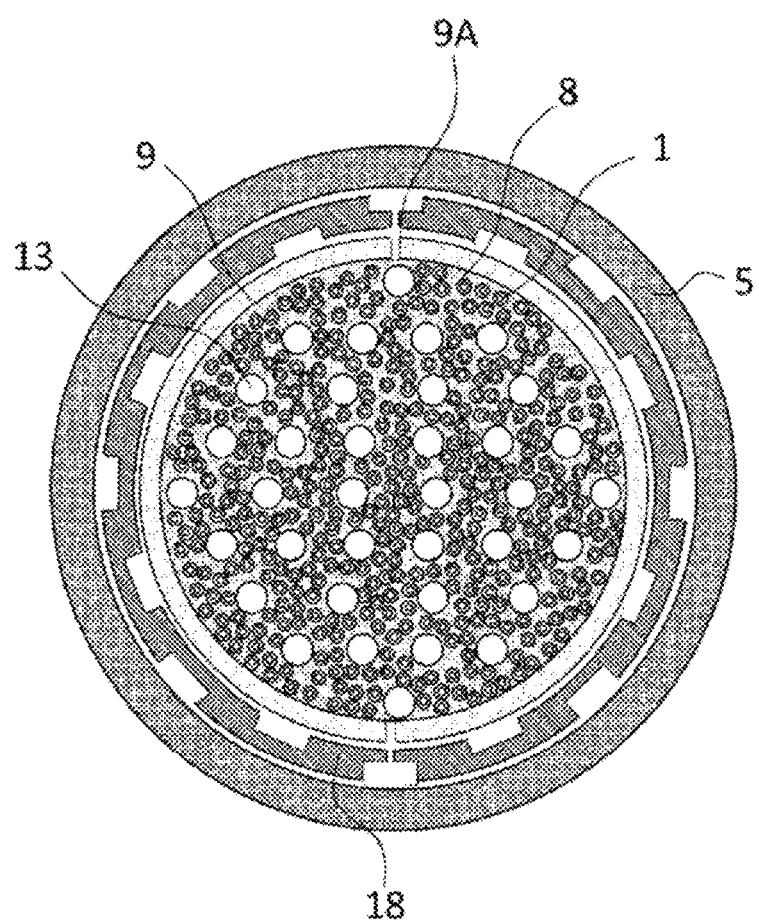
FIG. 6 is a cross-sectional diagram along line A-A in FIG. 4.

FIG. 4 is a schematic longitudinal cross-sectional diagram of the hollow-fiber membrane module 101 of a second embodiment of the present invention. In addition, FIG. 6 is a cross-sectional diagram along line A-A in FIG. 4. The hollow-fiber membrane module 101 includes a ring 18 having a notch as illustrated in FIG. 5, etc., in addition to the configuration of the first embodiment.

The ring 18 is inserted, as a holding member, between a second holding groove 19 formed in the outer surface of the protective member 9 and a first holding groove 17 formed in the inner surface of the housing to face the second holding groove, and the protective member 9 is thereby held in the housing while maintaining an appropriate gap. In this way, an embodiment where the protective member contacts with the outer surface of the second potting part, and the inner surface of the housing and the protective member are locked with each other by the holding member, is preferred.

The holding member is not limited to the above-exemplified ring, and the form thereof is not particularly limited as long as a gap allowing a fluid to move therethrough can be formed between the protective member and the housing.

5. Cross-Flow Filtration by Hollow-Fiber Membrane Module

One example of the filtration operation (water treatment) using the hollow-fiber membrane module of the present invention is described below.

Raw water as a material to be filtered flows into the hollow-fiber membrane module 100 or 101 through a raw water inlet 10 of the second cap 5, and a part thereof permeates into the hollow part of the hollow-fiber membrane 1 and flows out to the outside of the hollow-fiber membrane module 100 or 101 through a filtrate outlet 11 of the first cap 4. The remaining raw water not permeated into the inside of the hollow-fiber membrane 1 is discharged to the outside of the hollow-fiber membrane module 100 or 101 through a raw water outlet 12.

A method of performing filtration in this way by flowing a material to be filtered in the longitudinal direction of the hollow-fiber membrane is referred to as cross-flow filtration and is effective in preventing suspended substances, etc. in the raw water from depositing on the surface of the hollow-fiber membrane. When the raw water outlet 12 is closed, dead-end filtration of filtering all the raw water can be performed, or when air is supplied from the raw water inlet 10, cleaning of the hollow-fiber membrane 1 by air scrubbing can also be performed. In the cross-flow filtration or air scrubbing, the second potting part 8 may move due to a material to be filtered, which is flowed in through the raw water inlet 10, and the hollow-fiber membrane 1 consequently may deform to cause damage to the hollow-fiber membrane 1. Therefore, as in the hollow-fiber membrane module of the second embodiment, the protective member is preferably held in a housing so as to suppress the movement of the second potting part 8.

Namely, in the hollow-fiber membrane module of the present invention, a holding member is preferably inserted between a holding groove formed in the outer surface of the protective member and a holding groove formed in the inner surface of the housing to face the holding groove above.

6. Production Method of Hollow-Fiber Membrane Module

The production method of the hollow-fiber membrane module of the present invention includes (1) a potting part-forming step of forming a potting part and thereby bundling a plurality of hollow-fiber membranes to obtain a hollow-fiber membrane bundle, and (2) a protective member-bonding step of bonding a protective member such that the protective member contacts with the outer surface of the potting part and continuously covers the outer surface.

The potting part-forming step included in the production method of the hollow-fiber membrane module of the present invention is a step of forming a potting part so as to bundle a plurality of hollow-fiber membranes and thereby to obtain a hollow-fiber membrane bundle.

The potting part is formed by filling spaces between hollow fibers with a potting agent containing a potting resin as a main component, which is a so-called adhesive.

The potting agent is preferably subjected in advance to a defoaming treatment such as centrifugal defoaming or vacuum defoaming so as to reduce air bubbles, etc. in the inside thereof.

The shape of the obtained hollow-fiber membrane bundle is preferably a cylindrical shape that facilitates bundling.

The protective member-bonding step included in the production method of the hollow-fiber membrane module of the present invention is a step of bonding a protective member such that the protective member contacts with the outer surface of the potting part and continuously covers the outer surface.

The potting agent containing, as a main component, a potting resin such as epoxy resin, polyurethane resin or silicone resin undergoes curing shrinkage when changing from a liquid state to a solid state. When a liquid-state potting agent with which the protective member contacts undergoes curing shrinkage, while a stress of pulling the protective member toward the potting agent side generates, the protective member cannot follow it, and the protective member is sometimes separated from the potting agent.

On the other hand, when the potting agent is sufficiently cured and shrunk in the potting part-forming step (1) and thereafter, the protective member is bonded in the protective member-bonding step (2), separation of the protective member due to curing shrinkage of the liquid-state potting agent can be suppressed. In order to promote curing shrinkage of the liquid-state potting agent and increase the strength of the potting part after curing shrinkage, it is preferable to perform a heat treatment subsequently to the potting part-forming step (1).

The viscosity of the adhesive used for the bonding of the protective member is preferably from 500 to 30,000 mPa·s so as to obtain appropriate coating property while preventing dripping, etc.

Furthermore, in order to more enhance the adhesion of the protective member to the outer surface of the potting part, it is also preferable to previously polish the outer surface of the potting part with sandpaper, etc. and thereby provide fine irregularities.

EXAMPLES

Cross-Flow Filtration Test

Raw water was flowed in through the raw water inlet of the hollow-fiber membrane module and flowed out or discharged (membrane surface linear velocity: 0.5 m/s) through the filtrate outlet at a flow rate of 300 L/hour and through the raw water outlet at a flow rate of 20 m$^3$/hour, and this operation was continued for 100 hours. Thereafter, the hollow-fiber membrane module was disassembled, and the presence or absence of bending (buckling) of the hollow-fiber membrane and damage to the second potting part was visually confirmed.

Adhesion Between Potting Part and Protective Member

The hollow-fiber membrane module was heated with water vapor at 125° C. for 1 hour and then disassembled such that the bonding interface can be observed, and the bonding area of the adhesive layer between the potting part and the protective member was visually observed to evaluate the presence or absence of separation.

Example 1

Figure 7:
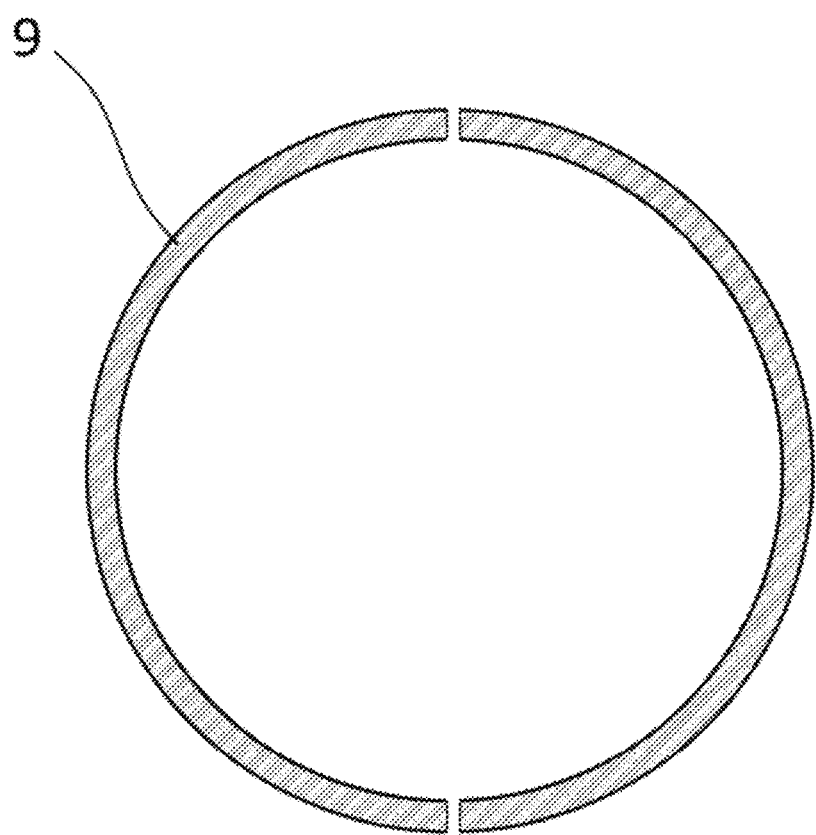
FIG. 7 is a schematic diagram illustrating one embodiment of the protective member.

A hollow-fiber membrane module illustrated in FIG. 1 was prepared by cylindrically bundling 6,000 polyvinylidene fluoride hollow fiber membranes (thickness: 225

μm, outer diameter: 1,250 μm, percentage of hollowness: 41%) subjected to preliminary heating with water vapor at 125° C. for 1 hour. The first potting part and the second potting part were molded by a static potting method using, as a potting agent, a mixture of a bisphenol A-type epoxy resin (JER828, produced by Mitsubishi Chemical Corporation), an aliphatic cyclic amine-based curing agent (4,4-methylenebis(cyclohexylamine), produced by Wako Pure Chemical Industries, Ltd.), and an aliphatic linear amine-based curing agent (diethylenetriamine, produced by Wako Pure Chemical Industries, Ltd.), which were previously preheated in a thermostat at 40° C. and mixed to obtain a mass ratio of 100:22:12. Part of the surface of the second potting part was polished with abrasive paper #80 and then, two semicircular protective members (made of polysulfone) illustrated in FIG. 7 in which the thickness of the member in a direction perpendicular to the longitudinal direction of the hollow-fiber membrane bundle is 6 mm were made to contact therewith using the potting agent above as an adhesive. The protective member consisting of two protective members had two notched parts, and the degree of coverage thereof for $L_{max}$ was 99%. The width of the notched part in a direction perpendicular to the longitudinal direction of the hollow-fiber membrane bundle was 2.5 mm.

The inner diameter of the cylindrical case (made of SUS316L) was 159.2 mm, and the gap between the second potting part and the housing was 0.5 mm or more.

This hollow-fiber membrane module was evaluated for the adhesion between the potting part and the protective member, as a result, separation was not observed after heating with water vapor at 125° C.

Example 2

Figure 8:
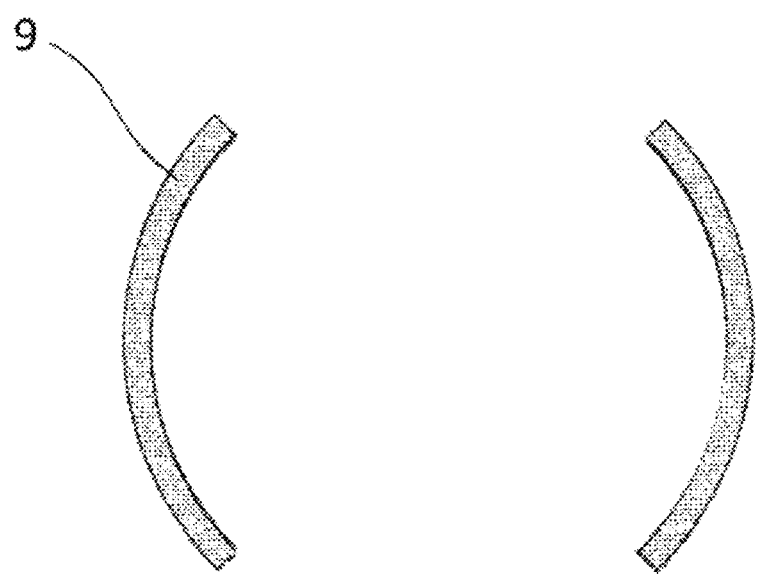
FIG. 8 is a schematic diagram illustrating one embodiment of the protective member.

A hollow-fiber membrane module was prepared in the same manner as in Example 1 except that the protective member was changed to those (made of polysulfone) illustrated in FIG. 8 in which the thickness of the member in a direction perpendicular to the longitudinal direction of the hollow-fiber membrane bundle is 6 mm. The protective member consisting of two protective members had two notched parts, and the degree of coverage thereof for $L_{max}$ was 50%. The width of the notched part in a direction perpendicular to the longitudinal direction of the hollow-fiber membrane bundle was 124.3 mm.

This hollow-fiber membrane module was evaluated for the adhesion between the potting part and the protective member, as a result, separation was not observed after heating with water vapor at 125° C.

Example 3

Figure 9:
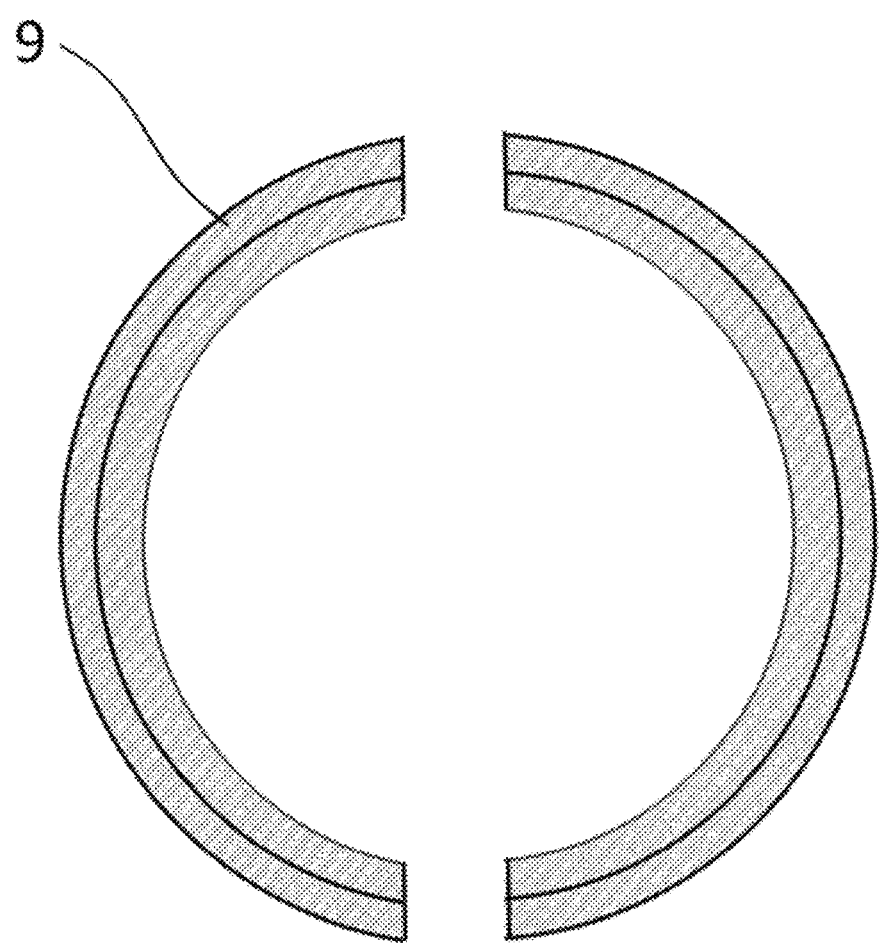
FIG. 9 is a schematic diagram illustrating one embodiment of the protective member.

A hollow-fiber membrane module illustrated in FIG. 4 was prepared by cylindrically bundling 6,000 polyvinylidene fluoride hollow fiber membranes (thickness: 225 μm, outer diameter: 1,250 μm, percentage of hollowness: 41%) subjected to preliminary heating with water vapor at 125° C. for 1 hour. The first potting part and the second potting part were molded by a static potting method using, as a potting agent, a mixture of a bisphenol A-type epoxy resin (JER828, produced by Mitsubishi Chemical Corporation), an aliphatic cyclic amine-based curing agent (4,4-methylenebis(cyclohexylamine), produced by Wako Pure Chemical Industries, Ltd.), and an aliphatic linear amine-based curing agent (diethylenetriamine, produced by Wako Pure Chemical Industries, Ltd.), which were previously preheated in a thermostat at 40° C. and mixed to obtain a mass ratio of 100:22:12. Part of the surface of the second potting part was polished with abrasive paper #80 and then, two semicircular protective members (made of polysulfone) illustrated in FIG. 9 in which the thickness of the member in a direction perpendicular to the longitudinal direction of the hollow-fiber membrane bundle is 6 mm were made to contact therewith using the potting agent above as an adhesive. The protective member consisting of two protective members had two notched parts, and the degree of coverage thereof for $L_{max}$ was 95%. The width of the notched part in a direction perpendicular to the longitudinal direction of the hollow-fiber membrane bundle was 12.4 mm. A groove as illustrated in FIG. 4 was formed in the outer surface of the second potting part, and the convex part of the protective member was made to contact with the groove in the outer surface of the second potting part.

A ring having a notch was inserted between the holding groove formed in the outer surface of the protective member and the holding groove formed in the inner surface of the housing to face the holding groove in the outer surface of the protective member.

The inner diameter of the cylindrical case (made of SUS316L) was 159.2 mm, and the gap between the second potting part and the housing was 0.5 mm or more.

With respect to this hollow-fiber membrane module, a cross-flow filtration test was conducted, as a result, neither damage to the second potting part and the protective member nor buckling of the hollow-fiber membrane was observed.

In addition, this hollow-fiber membrane module was evaluated for the adhesion between the potting part and the protective member, as a result, separation was not observed after heating with water vapor at 125° C.

Example 4

A hollow-fiber membrane module was prepared in the same manner as in Example 3 except that the protective member consisting of two protective members had two notched parts and the degree of coverage for $L_{max}$ of 99.8%, and the width of the notched part in a direction perpendicular to the longitudinal direction of the hollow-fiber membrane bundle was 0.5 mm.

With respect to this hollow-fiber membrane module, a cross-flow filtration test was conducted, as a result, neither damage to the second potting part and the protective member nor buckling of the hollow-fiber membrane was observed.

In addition, this hollow-fiber membrane module was evaluated for the adhesion between the potting part and the protective member, as a result, separation was not observed after heating with water vapor at 125° C.

Example 5

A hollow-fiber membrane module was prepared in the same manner as in Example 4 except that the protective member consisting of two protective members had two notched parts and the degree of coverage for $L_{max}$ of 20.0%, and the width of the notched part in a direction perpendicular to the longitudinal direction of the hollow-fiber membrane bundle was 200 mm.

With respect to this hollow-fiber membrane module, a cross-flow filtration test was conducted, as a result, neither damage to the second potting part and the protective member nor buckling of the hollow-fiber membrane was observed.

In addition, this hollow-fiber membrane module was evaluated for the adhesion between the potting part and the protective member, as a result, separation was not observed after heating with water vapor at 125° C.

Comparative Example 1

A hollow-fiber membrane module was prepared in the same manner as in Example 1 except that the static potting was performed after previously attaching a protective member in which the thickness of the member in a direction perpendicular to the longitudinal direction of a cylindrical hollow-fiber membrane bundle is 6 mm to a potting jig, and the degree of coverage for $L_{max}$ was 100% (having no notched part).

With respect to this hollow-fiber membrane module, a cross-flow filtration test was conducted, as a result, damage to the protective member was observed. In addition, damage due to buckling of the hollow-fiber membrane was recognized.

In addition, this hollow-fiber membrane module was evaluated for the adhesion between the potting part and the protective member, as a result, separation was observed after heating with water vapor at 125° C.

While the present invention has been described in detail and with reference to specific embodiments thereof, it will be apparent to one skilled in the art that various changes and modifications can be made therein without departing from the aim and scope of the invention. This application is based on Japanese Patent Application (Japanese Patent Application No. 2018-141044) filed on Jul. 27, 2018, the entirety of which is incorporated herein by way of reference.

REFERENCE SIGNS LIST

100 Hollow-fiber membrane module
101 Hollow-fiber membrane module
1 Hollow-fiber membrane
2 Hollow-fiber membrane bundle
3 Cylindrical case
3A Flange part
3B Flange part
4 First cap
4A Step part
5 Second cap
6 First potting part
7 Flow-regulating cylinder
7A Flange part
8 Second potting part
9 Protective member
9A Notched part
10 Raw water inlet
11 Filtrate outlet
12 Raw water outlet
13 Through-hole
14 Flow-regulating hole
15 O-ring
16 Gasket
17 First holding groove
18 Ring
19 Second holding groove
20 Gap
21 Gap

The invention claimed is:

1. A hollow-fiber membrane module comprising:
a hollow-fiber membrane bundle comprising a plurality of hollow-fiber membranes bundled in a potting part;
a housing enclosing the hollow-fiber membrane bundle; and
a protective member adhered to and continuously covering an outer surface of the potting part through a cured adhesive layer which is in direct contact with the protective member and with the outer surface of the potting part,
wherein there is a gap between the protective member and the housing, and
wherein the protective member has a notched part through which one end of the protective member communicates with another end in a longitudinal direction of the hollow-fiber membrane bundle, and at which the outer surface of the potting part is exposed.

2. The hollow-fiber membrane module according to claim 1, wherein the hollow-fiber membrane bundle is bundled at both ends in potting parts.

3. The hollow-fiber membrane module according to claim 1, wherein the protective member has a plurality of notched parts.

4. The hollow-fiber membrane module according to claim 1, wherein one protective member or a plurality of protective members are arranged to cover 20% or more and less than 99.9% of a total length of a line $L_{max}$, when assuming that lines L, whose start point and end point coincide with each other, are drawn by setting one point within the potting part on the surface of the potting part as a basis point and connecting, in a continuous manner, points in a direction perpendicular to the longitudinal direction of the hollow-fiber membrane bundle, and regarding the longest line among the lines L as the $L_{max}$.

5. The hollow-fiber membrane module according to claim 1, wherein the notched part of the protective member has a width of 0.5 mm or more in the direction perpendicular to the longitudinal direction of the hollow-fiber membrane bundle.

6. The hollow-fiber membrane module according to claim 1, wherein the protective member contacts with an outer surface of a second potting part, and
an inner surface of the housing and the protective member are locked with each other by a holding member.

7. A production method of the hollow-fiber membrane module according to claim 1, the method comprising:
a potting part-forming step of forming the potting part and thereby bundling the plurality of hollow-fiber membranes to obtain the hollow-fiber membrane bundle; and
a protective member-bonding step of bonding the protective member to the outer surface of the potting part through a cured adhesive layer which is in direct contact with the protective member and with the outer surface of the potting part, and where the protective member continuously covers the outer surface of the potting part.

* * * * *